Inventor:
EDWIN T. LORIG,
by his Attorneys.

June 18, 1935.  E. T. LORIG  2,005,587
OIL SEAL
Filed Aug. 8, 1933  3 Sheets-Sheet 3

Inventor:
EDWIN T. LORIG,
by: Usina & Lauber
his Attorneys.

Patented June 18, 1935

2,005,587

UNITED STATES PATENT OFFICE 2,005,587

OIL SEAL

Edwin T. Lorig, Gary, Ind., assignor to American Sheet and Tin Plate Company, a corporation of New Jersey Application August 8, 1933, Serial No. 684,286

1 Claim. (Cl. 286—11)

This invention relates to oil seals for all types of moving surfaces wherein it is desired to maintain a perfect seal against the escape of oil or other lubricants from bearings, etc.

In a great many instances, the escape of lubricant from bearings works many hardships in addition to the evils of extravagance and the soiling of machinery and adjacent surroundings. This is particularly true of sheet metal working mills.

In continuous strip units of the "4-high" cold reduction type, for instance, the lubricant for the journals of the various roll necks must be perfectly restrained from flowing out onto the bodies, or working surfaces, of the rolls, otherwise considerable difficulty will arise from oily deposits on the material being processed. If the material is to be annealed, the oil coating will form light carbon deposits which can be removed only by resorting to very troublesome operations. If pickling is to follow the metal working operation, the deposits of oil are likewise difficult to remove.

The roll bodies of 4-high cold reduction strip mills must be kept at a constant temperature in order to prevent uneven expansion. If this is not done many variances will be evident in the product. This difficulty is partially overcome by spraying a liquid coolant directly onto the bodies of the various rolls. Even if the coolant employed is in the nature of a lubricant, it is still entirely unfit to commingle with the lubricant for the roll neck journals. Under the foregoing circumstances, it is obvious that a perfect seal must be maintained between the coolant for the roll bodies and the lubricant for the roll neck journals, if operations of commercially successful proportions are to be obtained. The rolls of mills of the type described are frequently held against the material under pressures up to as high as five million pounds on each screw of the roll-adjusting mechanism. Such pressures often cause the deformation of the bodies of the rolls, resulting in the eccentric movement of the sides thereof. It will be readily appreciated that extreme difficulty is experienced in maintaining a perfect seal under these circumstances.

One object of the present invention is the provision of means for effecting a perfect seal for roll neck journals, resulting in the ability to efficiently lubricate the roll necks while simultaneously enabling the perfect maintenance of a constant temperature of the roll bodies by the use of a foreign coolant.

Another object is to provide a novel oil seal which will function perfectly under all conditions, is cheap and easy to manufacture and one which is extremely durable in service.

A further object is the provision of a novel construction of the class described which does not require inspection or adjustment.

These and still further objects will be apparent after referring to the drawings, in which.

Figure 1:
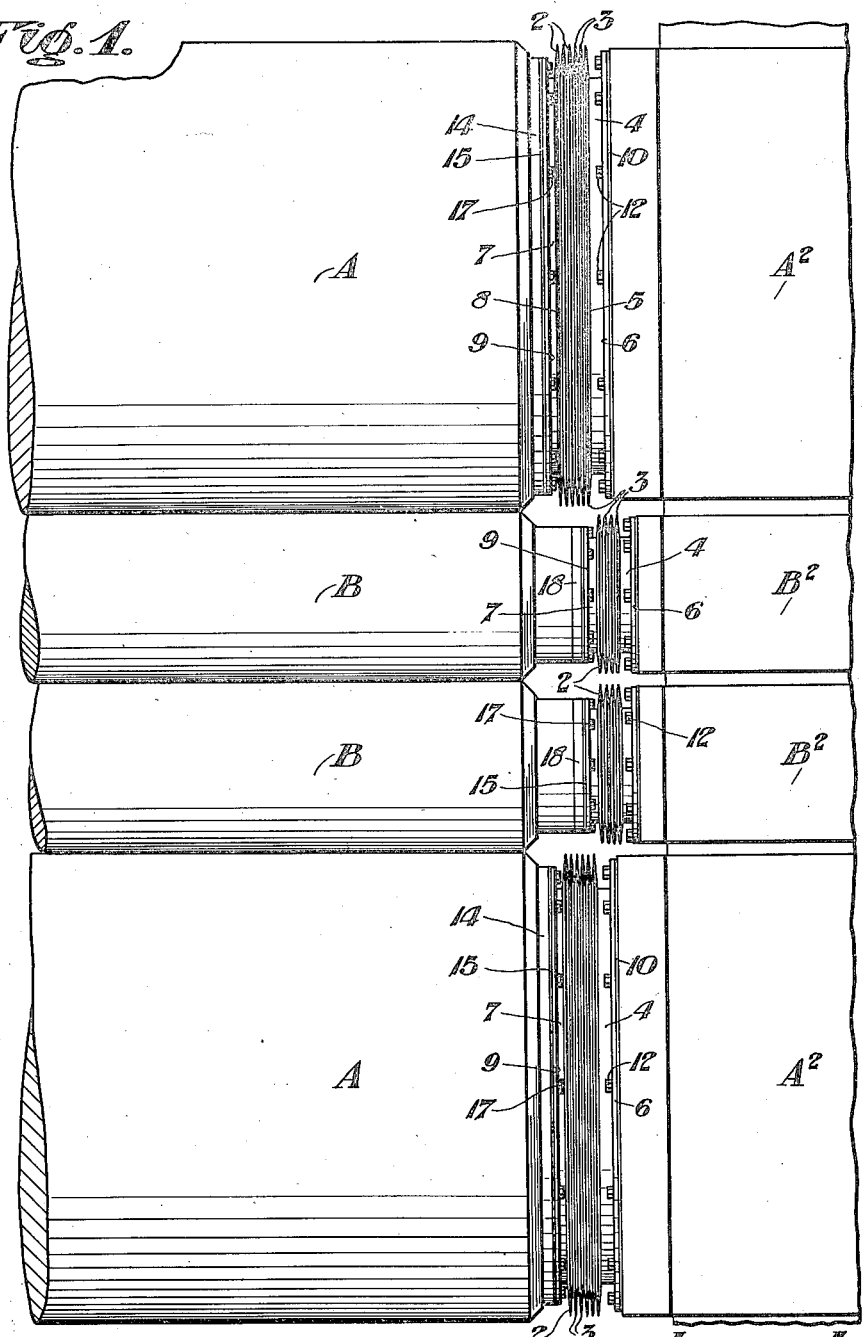
Figure 1 is a fragmentary elevation of a 4-high reduction mill.
Figure 2:
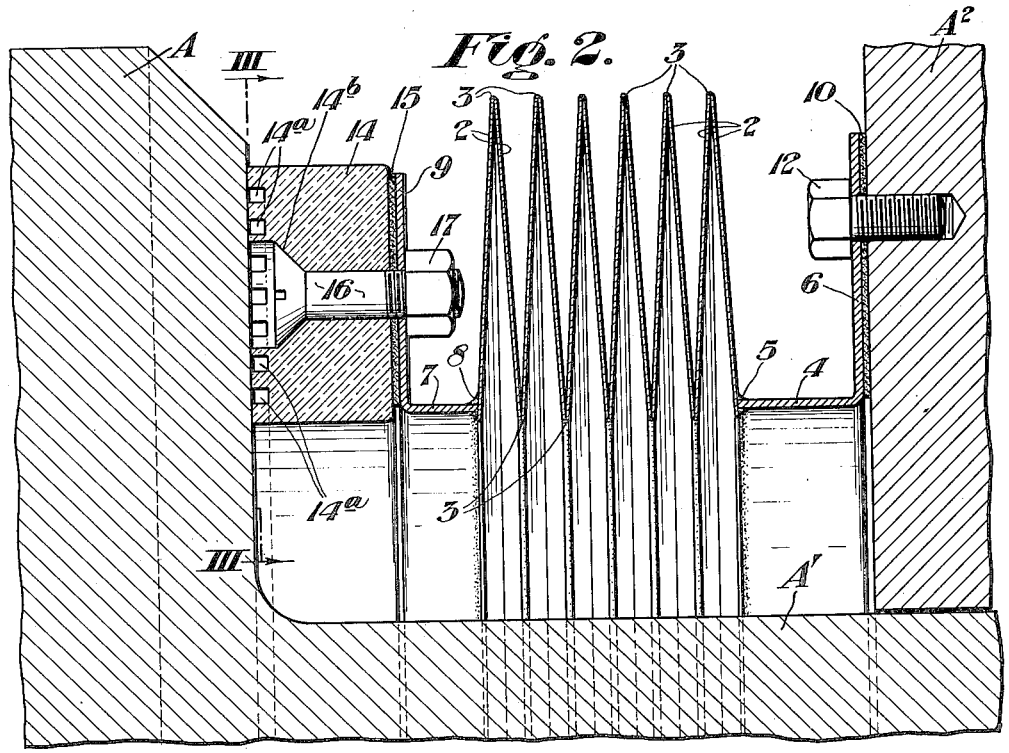
Figure 2 is a sectional elevation of the device of the invention as used on the backing-up rolls of the 4-high mill of Figure 1.
Figure 3:
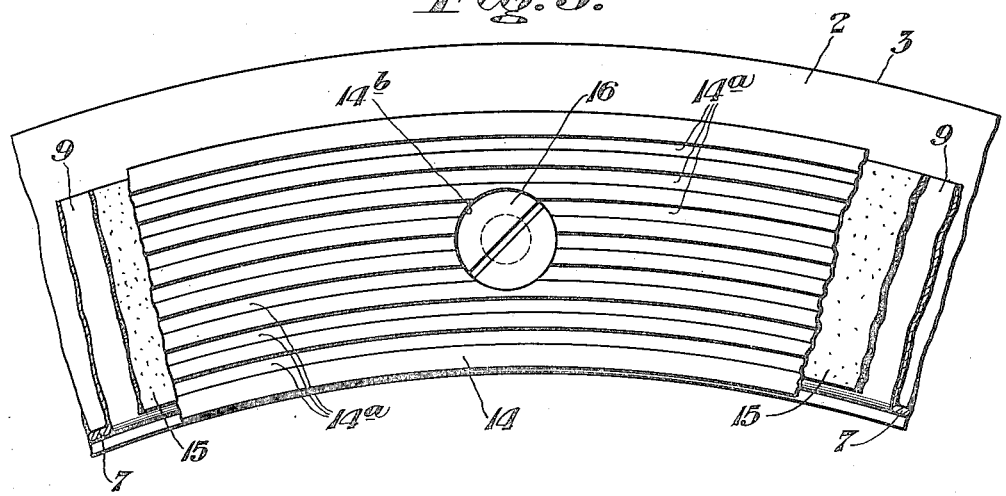
Figure 3 is a fragmentary view on the line III—III of Figure 2.

Referring more particularly to the drawings, the letters A designate a pair of large backing-up rolls, such as are commonly used in 4-high mills. A pair of smaller metal working rolls B are disposed intermediate the backing-up rolls A and in contact therewith. The backing-up rolls A have ends, or necks A', of reduced diameter that are journaled in bearings which are disposed within bearing blocks $A^2$, while the metal working rolls B have similar portions B', of reduced diameter, that are journaled in bearings which are disposed within bearing blocks $B^2$.

In accordance with the teaching of the invention, a plurality of concentric rings 2 are arranged with their successive inner and outer edges in contact and welded, as at 3, in order to form a bellows of the well known "sylphon" type having an enlarged central aperture. A cylindrical sleeve 4 is welded to the inner edge of one of the end rings of the bellows, as at 5, and carries an integral circular flange 6. A similar cylindrical sleeve 7 is welded to the inner edge of the other of the end plates of the bellows, as at 8, and carries a similar integral circular flange 9. The circular flange 6 is provided with a gasket 10 and secured to the bearing block $A^2$ in any suitable manner, as by means of capscrews 12.

The novel sealing ring for the ends of the backing-up rolls A is shown at 14 and is preferably formed of "micarta" which is a composition of a fabric and a phenolic condensation product. The sealing ring 14 may be manufactured in any suitable way as, for instance, by assembling laminations of fabric and bakelite and heat treating the combination under pressure to form a hard, compact, and coherent mass.

A plurality of continuous grooves 14ᵃ are provided in the contact face of the sealing ring 14 for entrapping any substances which progress beyond its initial contact area, in addition to which they serve to retain lubricating media. Suitable apertures having countersunk openings, as at 14ᵇ, are provided for enabling the ring to be attached. A gasket 15 is disposed between the sealing ring 14 and the circular flange 9 and suitable bolts and nuts 16 and 17, respectively, are employed to maintain the ring in position.

Figure 4:
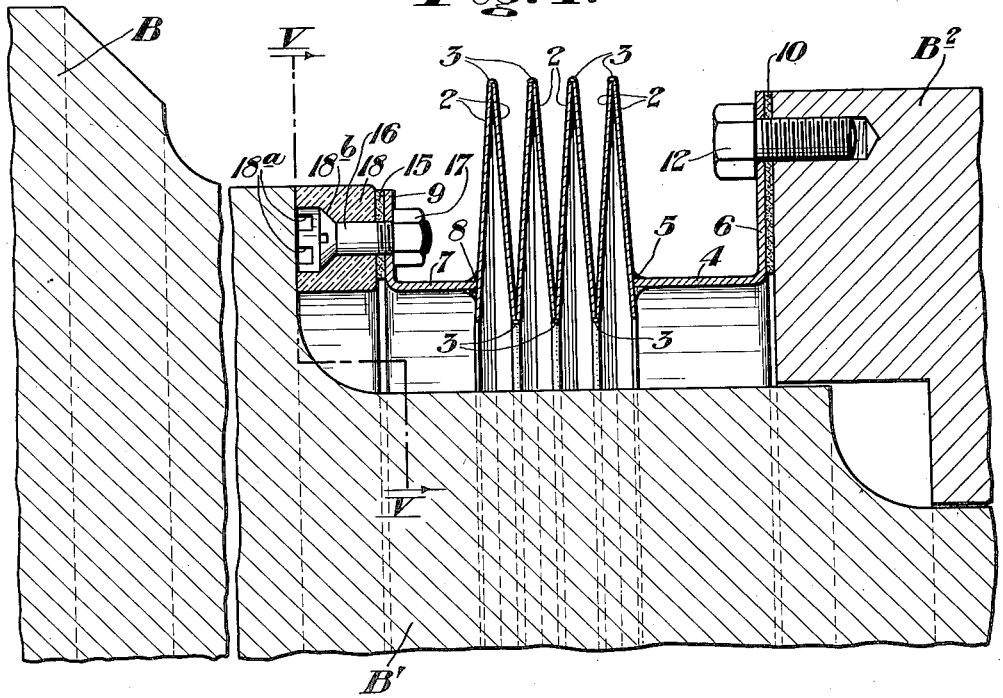
Figure 4 is a sectional elevation of the device of the invention as slightly modified for use on the smaller metal working rolls of the mill of Figure 1.
Figure 5:
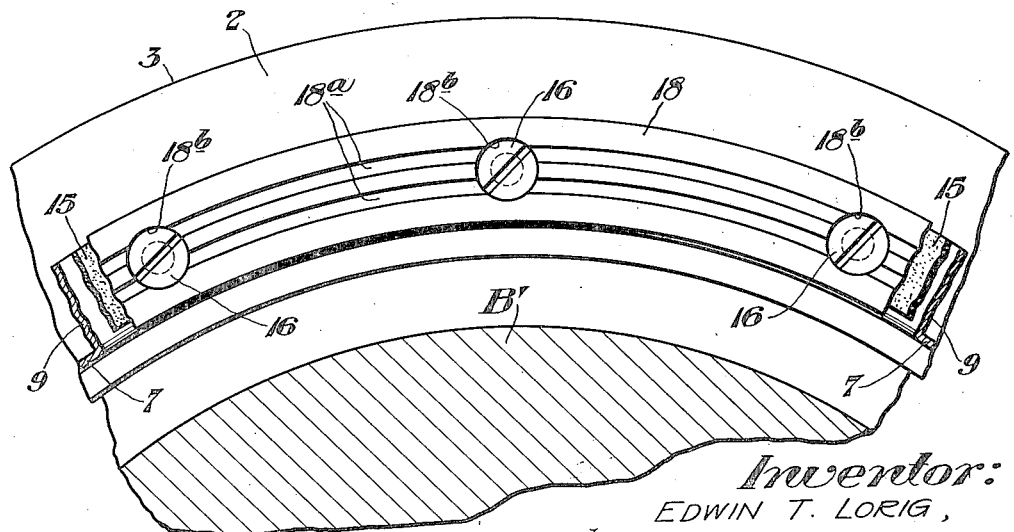
Figure 5 is a fragmentary view on the line V—V of Figure 4.

Referring to Figures 4 and 5 of the drawings, a construction is disclosed for use on the smaller metal working rolls B, and is similar except as to size and the provision of a slightly modified sealing ring.

The modified sealing ring 18 is itself substantially smaller and is provided with considerably fewer grooves, as at 18ᵃ.

The rolls of the 4-high mill of Figure 1 are preferably cooled by a suitable liquid, usually composed, for the most part, of water. When the novel devices of the invention are first installed, the grooves 14ᵃ and 18ᵃ of the various sealing rings will receive a small quantity of the coolant, largely water, which will be retained to serve as an ideal lubricating medium. The device of the invention will be resiliently held in contact with the adjacent side of the body of the roll, irrespective of its eccentric movement, caused by deformation under high screw-pressure.

It is to be understood that my invention is not limited to use on a 4-high cold reduction strip mill, as it may be very successfully employed on numerous types of rotary elements, and while I have shown and described several specific embodiments of certain details of construction I do not wish to be limited thereto, since various modifications may be made without departing from the scope of my invention, as defined in the following claim.

I claim:

In a rolling mill employing rolls which are supplied with different lubricants on their respective body and neck-end portions, the combination of a seal for preventing the intermingling of said lubricants, said seal comprising a resilient bellows having a central aperture through which the neck-end of the roll is adapted to extend, means for securing one end of said bellows to the bearing block of the mill, and a sealing ring secured to the outer end of said bellows and adapted to be resiliently held in contact with the adjacent side of the body of said roll irrespective of eccentric movement thereof, said sealing ring being composed of a fabric and a phenolic condensation product and having a plurality of annular grooves in its contact surface, whereby any lubricant tending to flow from the body of said roll to the neck-end thereof is entrapped and likewise any lubricant tending to flow out from the neck-end of said roll is entrapped, said entrapped lubricants serving to increase the sealing effect of said sealing ring.

EDWIN T. LORIG.